US009035931B2

(12) United States Patent
Seo

(10) Patent No.: US 9,035,931 B2
(45) Date of Patent: May 19, 2015

(54) LIQUID CRYSTAL DISPLAY DEVICE AND METHOD OF DRIVING THE SAME

(75) Inventor: Byeong-Ryeol Seo, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 1351 days.

(21) Appl. No.: 12/292,136

(22) Filed: Nov. 12, 2008

(65) Prior Publication Data

US 2009/0128536 A1 May 21, 2009

(30) Foreign Application Priority Data

Nov. 21, 2007 (KR) ........................ 10-2007-0119283

(51) Int. Cl.
*G06F 3/038* (2013.01)
*G09G 5/00* (2006.01)
*G09G 3/36* (2006.01)

(52) U.S. Cl.
CPC .......... *G09G 3/3655* (2013.01); *G09G 2300/04* (2013.01); *G09G 2320/02* (2013.01); *G09G 2320/0223* (2013.01); *G09G 2320/0233* (2013.01)

(58) Field of Classification Search
USPC .......................................................... 345/211
See application file for complete search history.

(56) References Cited

U.S. PATENT DOCUMENTS

2002/0063703 A1 5/2002 Furuhashi et al.
2004/0012058 A1* 1/2004 Aoki ............................. 257/414
2005/0156840 A1* 7/2005 Kim et al. ....................... 345/87
2006/0139556 A1 6/2006 Ahn et al.
2006/0145995 A1 7/2006 Kim et al.

FOREIGN PATENT DOCUMENTS

FR 2895827 A1 7/2007
JP 04-191821 7/1992
JP 2002-090770 3/2002
JP 2002-169138 6/2002
JP 2006-178404 7/2006
KR 10-2006-0077951 A 7/2006
KR 10-2006-0134718 A 12/2006

OTHER PUBLICATIONS

Japanese Office Action from corresponding Patent Application No. 2008-297745, dated Oct. 18, 2011.
French Office Action dated Oct. 26, 2012.
Office Action dated Nov. 18, 2013, issued by the Korean Intellectual Property Office in Korean Patent Application No. 10-2007-0119283.

* cited by examiner

*Primary Examiner* — Seokyun Moon
(74) *Attorney, Agent, or Firm* — Morgan, Lewis & Bockius LLP

(57) ABSTRACT

A liquid crystal display device includes: a first substrate having a display area and a non-display area surrounding the display area, the first substrate including first, second, third and fourth sides; a first common line formed in the non-display area corresponding to the second, third and fourth sides of the first substrate; a second substrate facing and spaced apart from the first substrate; a common electrode formed on an entire surface of the second substrate; and a liquid crystal layer between the first and second substrates.

13 Claims, 3 Drawing Sheets

LIQUID CRYSTAL DISPLAY DEVICE AND METHOD OF DRIVING THE SAME

This application claims the benefit of Korean Patent Application No. 2007-0119283, filed on Nov. 21, 2007, which is hereby incorporated by reference in its entirety.

TECHNICAL FIELD

The present application relates to a liquid crystal display device, and more particularly, to a liquid crystal display device having a common line and a common voltage compensation circuit unit and a method of driving the liquid crystal display device.

BACKGROUND

Among various display devices, a liquid crystal display (LCD) device has been widely used in notebook computers, office automation apparatus, and audio/video apparatus because of their superior operational characteristics such as light weight and low power consumption. Specifically, an active matrix LCD (AM-LCD) device that employs switching elements and pixel electrodes arranged in a matrix structure is the subject of significant research and development because of its high resolution and superior suitability for displaying moving images.

For the purpose of displaying images in a liquid crystal panel of an LCD device, a common voltage is supplied to each pixel so that liquid crystal molecules rotate according to a voltage difference between a data signal supplied from a data driving unit and the common voltage.

FIG. 1 is a view showing a liquid crystal display device according to the related art. In FIG. 1, a liquid crystal display device includes a liquid crystal panel 60, a driving printed circuit board (PCB) unit 50, a plurality of gate driving units 82, 84 and 86 and a plurality of data driving units 72, 74 and 76. The driving PCB unit 50 includes a plurality of driving circuits such as a timing controller, a power supply and a gamma reference voltage generator and a common voltage compensation circuit unit 52 for supplying and compensating a common voltage. The common voltage compensation circuit 52 receives the common voltage passing through the liquid crystal panel 60 and compares the common voltage with a reference voltage or an initial common voltage. Further, the common voltage compensation circuit 52 generates a compensated common voltage on the basis of a difference between the common voltage and the reference voltage and supplies the compensated common voltage to the liquid crystal panel 60 again.

The liquid crystal panel 60 includes first and second substrates (not shown) and a liquid crystal layer (not shown) between the first and second substrates. A display area and a non-display area surrounding the display area are defined in liquid crystal panel 60 and the display area includes a plurality of pixel regions. A plurality of conductive dots, e.g., first to fourth conductive dots Ag1 to Ag4 including silver (Ag) are formed at edge portions of the non-display area of the first substrate. The common voltage supplied by the common voltage compensation circuit 52 is transmitted to a common electrode on the second substrate through the first to fourth conductive dots Ag1 to Ag4.

The plurality of data driving units may include first, second and third data driving units 72, 74 and 76 and the plurality of gate driving units may include first, second and third gate driving units 82, 84 and 86. Each of the first, second and third data driving units 72, 74 and 76 includes a data driving integrated circuit (IC) and is connected to the driving PCB unit 50 and one side of the liquid crystal panel 60. In addition, each of the first, second and third gate driving units 82, 84 and 86 includes a gate driving IC and is connected to the other side of the liquid crystal panel 60. For example, each of the first, second and third data driving units 72, 74 and 76 and the first, second and third gate driving units 82, 84 and 86 may include one of tape carrier package (TCP) and flexible printed circuit (FPC).

The common voltage outputted from the common voltage compensation circuit 52 is supplied to the liquid crystal panel 60 through the first data driving unit 72, and is transmitted to the first to fourth conductive dots Ag1 to Ag4 though first, second and third common lines VL1, VL2 and VL3. The first common line VL1 is formed in the non-display area corresponding to three sides of the liquid crystal panel 60. In addition, the second common line VL2 is formed in the first, second and third gate driving units 82, 84 and 86, and the third common line VL3 is formed in the non-display area corresponding to one side of the liquid crystal panel 60 adjacent to the first, second and third data driving units 72, 74 and 76. The common voltage transmitted to the first to fourth conductive dots Ag1 to Ag4 is applied to a common electrode of the second substrate. The common voltage as a feedback voltage is inputted to the common voltage compensation circuit 52 through the third data driving unit 76, and the common voltage compensation circuit 52 generates the compensated common voltage using the common voltage through the liquid crystal panel 60. The common voltage compensation circuit 52 supplies the compensated common voltage to the liquid crystal panel 60 again.

The first common line VL1 forms a first loop LOOP1 as a path for the common voltage. In addition, portions of the first common line VL1 and the second common line VL2 forms a second loop LOOP2 as a path for the common voltage, and the third common line VL3 between the first and fourth conductive dots Ag1 and Ag4 forms a third loop LOOP3 as a path for the common voltage. Accordingly, the common voltage is transmitted to the first to fourth conductive dots Ag1 to Ag4 through the first, second and third loops LOOP1, LOOP2 and LOOP3 of the first substrate and is applied to the common electrode of the second substrate.

However, since the first, second and third common lines VL1, VL2 and VL3 have a different length and a different arrangement, the first, second and third loops LOOP1, LOOP2 and LOOP3 have a different resistance and a different capacitance. For example, the common voltage through the third loop LOOP3 having a minimum length may have a minimum voltage drop. As a result, most of a current for the common voltage flows through the third loop LOOP3 and the compensated common voltage generated by the common voltage compensation circuit 52 reflects only the voltage drop in third loop LOOP3 and in a portion of the common electrode between the first and fourth conductive dots Ag1 and Ag4. Accordingly, the common voltage compensation circuit 52 compensates the voltage drop through an upper portion A of the liquid crystal panel 60 and does not compensate the voltage drop through middle and lower portions B and C of the liquid crystal panel 60. The voltage drop in the common voltage at the middle and lower portions B and C causes deterioration of display quality such as a greenish phenomenon.

In addition, the compensated common voltage is not completely applied to the entire portion of the common electrode due to the voltage drop. FIGS. 2A and 2B are views showing a compensated common voltage and a measured common voltage, respectively, of a liquid crystal display device according to the related art. In FIG. 2A, the compensated voltage generated by the common voltage compensation circuit 52 (of FIG. 1) changes from about −6V to about +6V according to a time. Although the compensated common voltage is supplied to the liquid crystal panel through the first data driving unit 72 (of FIG. 1), most of the current for the compensated common voltage flows through the third loop LOOP3 (of FIG. 1) from the first conductive dot Ag1 to the fourth conductive dot Ag4. As a result, the compensated common voltage is not properly applied to the middle and lower portions B and C of the common electrode due to the voltage drop in the first and second loops LOOP1 and LOOP2. Specifically, as shown in FIG. 2B, the measured common voltage at the lower portion C changes from about −2V to about +2V even when the compensated voltage of FIG. 2A is applied. As a result, the common voltage is not completely compensated at the entire portion of the common electrode, and deterioration such as a greenish phenomenon is caused.

SUMMARY

Accordingly, the present invention is directed to a liquid crystal display device and a method of driving the liquid crystal display device that substantially obviates one or more of the problems due to limitations and disadvantages of the related art. An object of the present invention is to provide a liquid crystal display device where a common voltage is compensated by uniformly reflecting a voltage drop in common lines and a method of driving the liquid crystal display device.

A liquid crystal display device includes: a first substrate having a display area and a non-display area surrounding the display area, the first substrate including first, second, third and fourth sides; a first common line formed in the non-display area corresponding to the second, third and fourth sides of the first substrate; a second substrate facing and spaced apart from the first substrate; a common electrode formed on an entire surface of the second substrate; and a liquid crystal layer between the first and second substrates.

In another aspect, a method of driving a liquid crystal display device including a first substrate, a second substrate and a liquid crystal layer between the first and second substrates includes: supplying a common voltage to a first common line on a first substrate, the first substrate including first, second, third and fourth sides and the first common line corresponding to the second, third and fourth sides; generating a compensated common voltage using the common voltage through the first common line; and supplying the compensated common voltage to the first common line.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE PREFERRED EMBODIMENTS

Reference will now be made in detail to embodiments which are illustrated in the accompanying drawings. Wherever possible, similar reference numbers will be used to refer to the same or similar parts.

Figure 1:
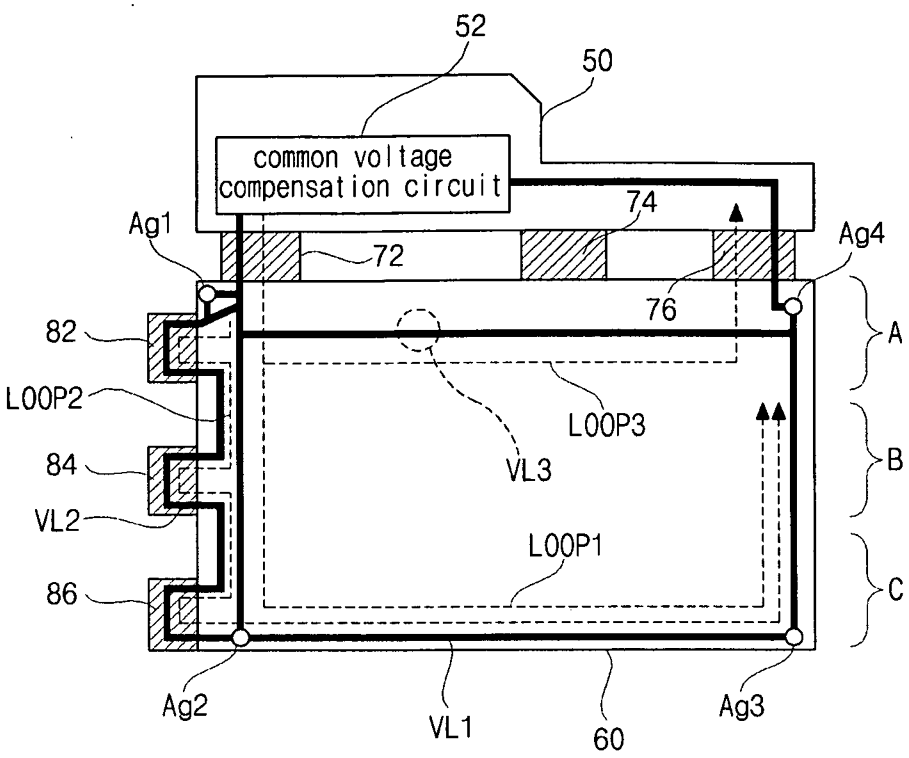
(related art) FIG. 1
FIG. 1 is a view showing a liquid crystal display device according to the related art.
Figure 2A:
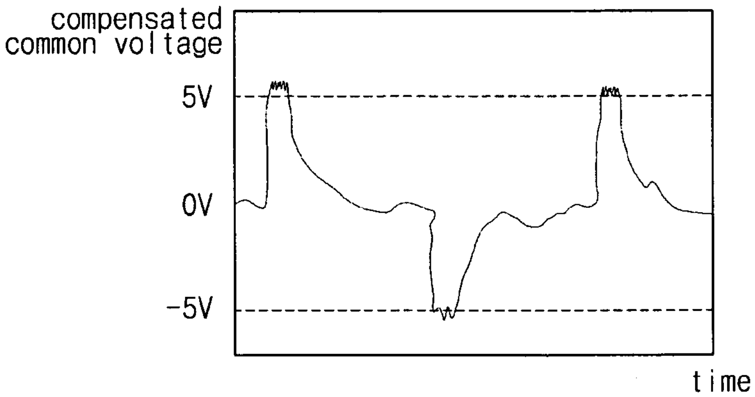
(related art) FIG. 2A
FIGS. 2A and 2B are views showing a compensated common voltage and a measured common voltage, respectively, of a liquid crystal display device according to the related art.
Figure 2B:
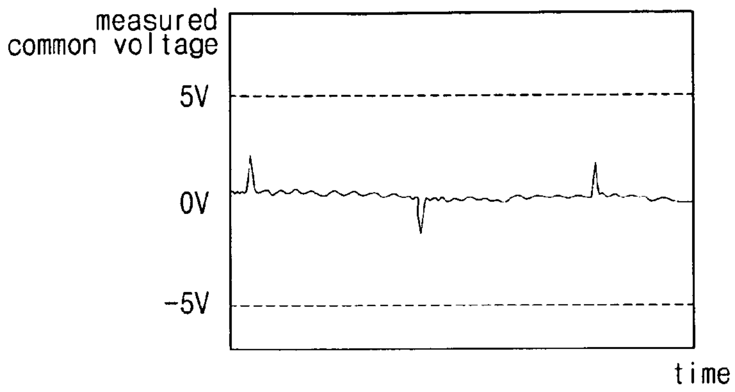
(related art) FIG.2B
Figure 3:
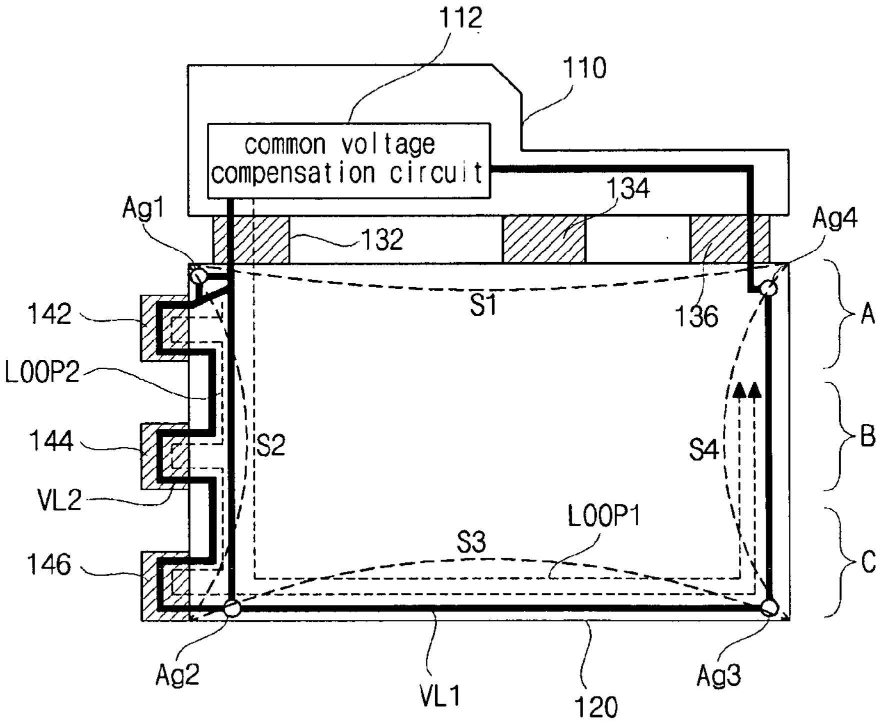
FIG. 3 is a view showing a liquid crystal display device according to an embodiment of the present invention.

FIG. 3 is a view showing a liquid crystal display device according to an embodiment of the present invention. In FIG. 3, a liquid crystal display (LCD) device includes a liquid crystal panel 120, a driving printed circuit board (PCB) unit 110, a plurality of data driving units 132, 134 and 136 and a plurality of gate driving units 142, 144 and 146. The driving PCB unit 110 includes a plurality of driving circuits such as a timing controller, a power supply and a gamma reference voltage generator and a common voltage compensation circuit unit 112 for supplying and compensating a common voltage. The common voltage compensation circuit 112 receives the common voltage passing through the liquid crystal panel 120 and compares the common voltage with a reference voltage or an initial common voltage. Further, the common voltage compensation circuit 112 generates a compensated common voltage on the basis of a difference between the common voltage and the reference voltage and supplies the compensated common voltage to the liquid crystal panel 120 again.

The liquid crystal panel 120 includes first and second substrates (not shown) facing and spaced apart from each other and a liquid crystal layer (not shown) between the first and second substrates. A display area and a non-display area surrounding the display area are defined in liquid crystal panel 120 and the display area includes a plurality of pixel regions each having a thin film transistor (not shown) and a pixel electrode (not shown) connected to the thin film transistor. Each pixel region is defined by a gate line (not shown) and a data line (not shown) crossing each other and connected to the thin film transistor. In addition, the liquid crystal panel 120 includes first, second, third and fourth sides S1, S2, S3 and S4. A plurality of conductive dots, e.g., first to fourth conductive dots Ag1 to Ag4 including silver (Ag) are formed in the non-display area at corner portions of the first substrate. Since the plurality of conductive dots connects a first common line VL1 of the first substrate and a common electrode of the second substrate, the common voltage supplied by the common voltage compensation circuit 112 is transmitted to the common electrode on the second substrate through the first to fourth conductive dots Ag1 to Ag4. The common electrode may be formed on an entire surface of the second substrate and may include a transparent conductive material such as indium-tin-oxide (ITO) and indium-zinc-oxide (IZO) in a twisted nematic (TN) mode LCD device.

The plurality of data driving units may include first, second and third data driving units 132, 134 and 136, and the plurality of gate driving units may include first, second and third gate driving units 142, 144 and 146. Each of the first, second and third data driving units 132, 134 and 136 includes a data driving integrated circuit (IC) and is connected to the driving PCB unit 110 and the first side S1 of the liquid crystal panel 120. In addition, each of the first, second and third gate driving units 142, 144 and 146 includes a gate driving IC and is connected to the second side S2 adjacent to the first side S1 of the liquid crystal panel 120. For example, each of the first, second and third data driving units 132, 134 and 136 and the first, second and third gate driving units 142, 144 and 146 may include one of tape carrier package (TCP) and flexible printed circuit (FPC).

The common voltage outputted from the common voltage compensation circuit 112 is supplied to the liquid crystal panel 120 through the first data driving unit 132, and is transmitted to the first to fourth conductive dots Ag1 to Ag4 though first and second common lines VL1 and VL2. The first common line VL1 is formed in the non-display area corresponding to the second, third and fourth sides S2, S3 and S4 of the liquid crystal panel 120 to have a U shape. In addition, the second common line VL2 is formed in the first, second and third gate driving units 142, 144 and 146 and the second side S2 of the first substrate to have a zigzag shape. The non-display area corresponding to the first side S1 of the liquid crystal panel 120 adjacent to the common voltage compensation circuit 112 does not include a common line. Accordingly, the first common line VL1 is exclusively formed in the non-display area corresponding to three sides except one side of the liquid crystal panel 120 adjacent to the common voltage compensation circuit 112.

The common voltage transmitted to the first to fourth conductive dots Ag1 to Ag4 is applied to the common electrode of the second substrate. The common voltage as a feedback voltage is inputted to the common voltage compensation circuit 112 through the third data driving unit 136, and the common voltage compensation circuit 112 generates the compensated common voltage using the common voltage through the liquid crystal panel 120. The common voltage compensation circuit 112 supplies the compensated common voltage to the liquid crystal panel 120 again.

The first common line VL1 forms a first loop LOOP1 as a path for the common voltage. In addition, portions of the first common line VL1 corresponding to the third and fourth sides S3 and S4 and the second common line VL2 form a second loop LOOP2 as a path for the common voltage. The common voltage is transmitted to the first to fourth conductive dots Ag1 to Ag4 through the first and second loops LOOP1 and LOOP2 of the first substrate and is applied to the common electrode of the second substrate. Since the first and second loops LOOP1 and LOOP2 have the substantially same resistance and capacitance as each other, a current for the common voltage flows through the first loop LOOP1 corresponding to the second, third and fourth sides S2, S3 and S4 and through the second loop LOOP2 corresponding to the first, second and third gate driving units 142, 144 and 146 and third and fourth sides S3 and S4. As a result, the compensated common voltage generated by the common voltage compensation circuit 112 reflects the voltage drop in first and second loops LOOP1 and LOOP2 and in the common electrode through the first and fourth conductive dots Ag1 and Ag4 and through the second and third conductive dots Ag2 and Ag3. Therefore, the common voltage compensation circuit 112 compensates the voltage drop through an entire portion including upper, middle and lower portions A, B and C of the liquid crystal panel 120, and deterioration in display quality such as a greenish phenomenon is prevented at the middle and lower portions B and C of the liquid crystal panel 120.

In the LCD device according to an embodiment of the present invention, since the liquid crystal panel 120 does not include a loop directly connecting the first and fourth conductive dots Ag1 and Ag4 at the first side S1, the common voltage is uniformly applied to the first to fourth conductive dots Ag1 to Ag4 and the entire portion of the common electrode through the first and second loops LOOP1 and LOOP2. As a result, the common voltage inputted to the common voltage compensation circuit 112 reflects a voltage drop in the first and second common lines VL1 and VL2 and the entire portion of the common electrode. Since the common voltage compensation circuit 112 generates the compensated common voltage on the basis of the common voltage, the compensated common voltage reflects the voltage drop in the whole portion of the liquid crystal panel 120 and deterioration such as a greenish phenomenon is prevented.

Figure 4A:
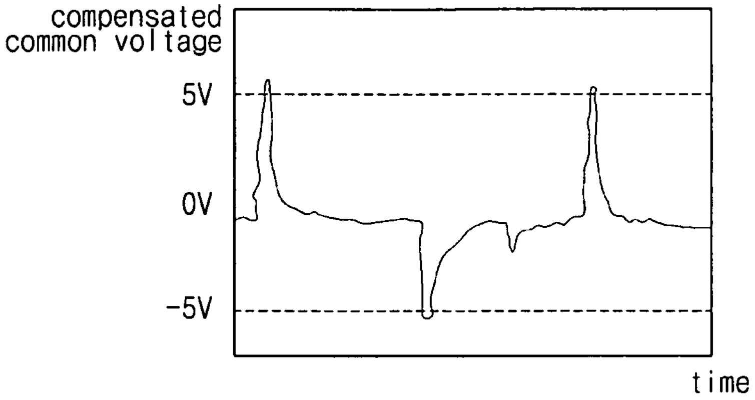
FIGS. 4A and 4B are views showing a compensated common voltage and a measured common voltage, respectively, of a liquid crystal display device according to an embodiment of the present invention.
Figure 4B:
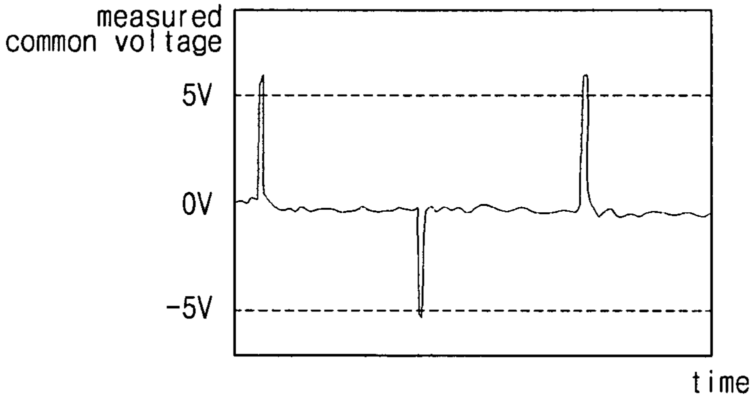

FIGS. 4A and 4B are views showing a compensated common voltage and a measured common voltage, respectively, of a liquid crystal display device according to an embodiment of the present invention.

In FIG. 4A, the compensated voltage generated by the common voltage compensation circuit 112 (of FIG. 3) changes from about −6V to about +6V according to a time. The compensated common voltage is supplied to the liquid crystal panel through the first data driving unit 142 (of FIG. 3), the current for the compensated common voltage flows through the first and second loops LOOP1 and LOOP2 (of FIG. 3) and the common electrode from the first and second conductive dots Ag1 and Ag2 to the third and fourth conductive dots Ag3 and Ag4. As a result, the compensated common voltage is uniformly applied to the entire portion including upper, middle and lower portions A, B and C of the common electrode with the substantially same voltage drop in the first and second loops LOOP1 and LOOP2. Accordingly, as shown in FIG. 4B, the measured common voltage at the lower portion C changes from about −6V to about +6V when the compensated voltage of FIG. 4A is applied. As a result, the common voltage is compensated at the entire portion of the common electrode, and deterioration such as a greenish phenomenon is prevented.

It will be apparent to those skilled in the art that various modifications and variations can be made in a liquid crystal display device and a method of driving the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:

a first substrate comprising a display area and a non-display area surrounding the display area, the first substrate including first, second, third, and fourth sides;

a plurality of common lines comprising a first common line exclusively and contiguously formed in the non-display area corresponding to the second, third, and fourth sides of the first substrate, the first side corresponding to the side of the first substrate adjacent to a common voltage compensation circuit, such that all loops formed by the plurality of common lines have substantially a same resistance and a same capacitance as each other;

a second substrate facing and spaced apart from the first substrate;

a common electrode formed on an entire surface of the second substrate; and a liquid crystal layer between the first and second substrates, wherein the first common line is connected to the common voltage compensation circuit adjacent to the first side, and wherein the common voltage compensation circuit is configured to:

supply a common voltage to the first common line, and generate a compensated common voltage using the common voltage through the first common line.

2. The device according to claim 1, further comprising:

a plurality of gate driving units connected to the second side of the first substrate;

a plurality of data driving units connected to the first side of the first substrate; and a driving printed circuit board (PCB) unit connected to the plurality of data driving units, the driving PCB unit including the common voltage compensation circuit.

3. The device according to claim 2, wherein each of the plurality of gate driving units includes a gate driving integrated circuit (IC) and each of the plurality of data driving units includes a data driving IC.

4. The device according to claim 2, further comprising a second common line formed in the plurality of gate driving units and the second side of the first substrate to have a zigzag shape.

5. The device according to claim 1, further comprising a plurality of conductive dots in the non-display area of the first substrate, the plurality of conductive dots connecting the first common line and the common electrode.

6. The device according to claim 5, wherein the plurality of conductive dots include silver (Ag).

7. The device according to claim 5, wherein the plurality of conductive dots include first, second, third, and fourth conductive dots at corner portions of the first substrate.

8. A method of driving a liquid crystal display device including a first substrate comprising a display area and a non-display area surrounding the display area, a second substrate, and a liquid crystal layer between the first and second substrates, the method comprising:

supplying a common voltage to a plurality of common lines comprising a first common line on the first substrate, the first substrate including first, second, third, and fourth sides, the first common line being exclusively and contiguously formed in the non-display area corresponding to the second, third, and fourth sides, the first side corresponding to the side of the first substrate adjacent to a common voltage compensation circuit, such that all loops formed by the plurality of common lines have substantially a same resistance and a same capacitance as each other, the first common line being connected to the common voltage compensation circuit adjacent to the first side, the common voltage compensation circuit supplying the common voltage to the first common line;

generating a compensated common voltage using the common voltage through the first common line by the common voltage compensation circuit; and supplying the compensated common voltage to the first common line.

9. The method according to claim 8, further comprising applying the common voltage to a common electrode on an entire surface of the second substrate facing and spaced apart from the first substrate.

10. The method according to claim 8, further comprising supplying the common voltage to a second common line in a plurality of gate driving units connected to the second side of the first substrate and in the second side of the first substrate to have a zigzag shape.

11. The device according to claim 4, wherein:

the first common line forms a first loop;

the second and third portions of the first common line and the second common line form a second loop; and the first and second loop have substantially the same resistance and the same capacitance as each other.

12. The device according to claim 11, wherein both ends of each of the first and second loops are connected to the common voltage compensation circuit.

13. The device according to claim 11, wherein a current for the common voltage flows through each of the first and second loops.

* * * * *